United States Patent [19]
Walley

[11] Patent Number: 6,084,505
[45] Date of Patent: Jul. 4, 2000

[54] METHOD AND APPARATUS FOR SENDING SIGNALS OVER AN ELECTRIC FENCE LINE

[76] Inventor: John Leonard Walley, 15 Houhere Place, Hamilton 2001, New Zealand

[21] Appl. No.: 08/947,804

[22] Filed: Oct. 9, 1997

Related U.S. Application Data

[63] Continuation of application No. 08/433,437, May 10, 1995, abandoned.

[30] Foreign Application Priority Data

Nov. 20, 1992 [NZ]  New Zealand ............................ 245206
Nov. 18, 1993 [NZ]  New Zealand ......... PCT/NW93/00116

[51] Int. Cl.$^7$ ...................................................... H05C 1/04
[52] U.S. Cl. ............................... 340/310.01; 340/825.69; 340/825.56; 340/564; 307/109
[58] Field of Search ........................ 340/825.69, 825.57, 340/564, 310.01, 825.62, 505; 256/10; 315/177; 307/109; 361/232; 375/239, 242, 258; 119/416; 455/38.1, 66, 68; 1/1; 341/173, 178

[56] References Cited

U.S. PATENT DOCUMENTS

| | | | |
|---|---|---|---|
| 3,873,847 | 3/1975 | Finch ....................................... | 307/109 |
| 4,270,735 | 6/1981 | Gavin ......................................... | 256/10 |
| 4,297,633 | 10/1981 | McCutchan et al. ............... | 340/505 X |
| 4,396,879 | 8/1983 | Weinreich et al. .................... | 256/10 X |
| 5,420,885 | 5/1995 | May ......................................... | 375/239 |
| 5,514,919 | 5/1996 | Walley ................................. | 256/10 X |
| 5,550,530 | 8/1996 | Hamm ..................................... | 340/564 |
| 5,651,025 | 7/1997 | May ......................................... | 375/239 |
| 5,790,023 | 8/1998 | Wolfgram ............................... | 340/564 |

*Primary Examiner*—Brian Zimmerman
*Attorney, Agent, or Firm*—Oppenheimer Wolff & Donnelly LLP

[57] ABSTRACT

A method and apparatus for electronically controlling an electric fence energizer. The method is characterized by the step of sending a user selectable coded signal along an electric fence line to the electric fence energizer, said coded signal causing the state of the electric fence energizer to change. The coded signal may come in a variety of forms, and in one embodiment the coded signal may comprise a number of short pulses sent predetermined times apart. Other types of signals may be sent with variations in amplitude or other differentiating characteristics. A coded signal that varies in the time domain is preferred due to signal attenuation. According to a preferred aspect of the present invention, a signalling device for interaction with a fence system is provided. The device has a power supply, signal producing means, and control means for the signal producing means. In operation, the power supply can provide power to the signal producing means, which is controlled by the control means to send a coded signal along the fence system. The preferred embodiment for the signal producing means is a capacitor, for the power supply, a battery, and for the control means a programmed microprocessor.

7 Claims, 5 Drawing Sheets

METHOD AND APPARATUS FOR SENDING SIGNALS OVER AN ELECTRIC FENCE LINE

RELATED APPLICATION

This is a continuation of U.S. patent application Ser. No. 08/433,437, which was filed on May 10, 1995, now abandoned.

TECHNICAL FIELD

This invention relates to a method and apparatus of electronic control.

BACKGROUND ART

In particular, the present invention will be discussed with respect to fence systems having electric fence energisers, although it may be possible that aspects of the present invention could be applied to other situations.

Electric fence energisers emit a high voltage pulse approximately every second. The 'intensity' of the pulse is such that it acts to deter stock from touching the electric fence.

Typically, an electric fence energiser supplies pulses to electric fences covering a very broad area of a farm. If the farmer is moving stock, has temporary electric fence lines or for some other reason wishes to turn off the electric fence energiser, then he/she usually has to walk a considerable distance to turn off the electric fence energiser or to turn the energiser back on.

A product was invented (which is the subject matter of U.S. Pat. No. 4,270,735) that applied a DC signal to the electric fence line by connecting a battery from the fence to ground. The signal was received by a device that turned the energiser off or on. Unfortunately, this device had many problems. For example the operation of the device was such that there was a large drain on the batteries used in the device to send the signal.

Poor electrical connections commonly occur on an electric fence, e.g. line clamps. Because of these poor connections, often the emitted signal would not reach the energiser switching device.

A further problem was that once the power supply was disconnected from the electric fence energiser, there was a significant start up time from when the electric fence energiser was turned on and the energy storage capacitor becoming sufficiently charged for normal energiser operation.

Further, the above device required a separate control device to the electric fence energiser. This totally separate device connected and disconnected the power supply to the energiser. The cost in labour required in producing the separate device was also a detriment commercially.

There are also other problems associated with attempting to send signals along an electric fence line. One such problem is that it is common for an electric fence line to have induced on it signals from other electric fences, power lines and the like. Often there is attenuation of a signal down the line as well.

It is an object of the present invention to address the above problems, or at least to provide the public with a useful choice.

Further objects and advantages of the present invention will become apparent from the following description which is given by way of example only.

BRIEF DESCRIPTION OF DRAWINGS

Aspects of the present invention will now be discussed by way of example only and with reference to the accompanying drawings in which.

DISCLOSURE OF INVENTION

Figure 1A:
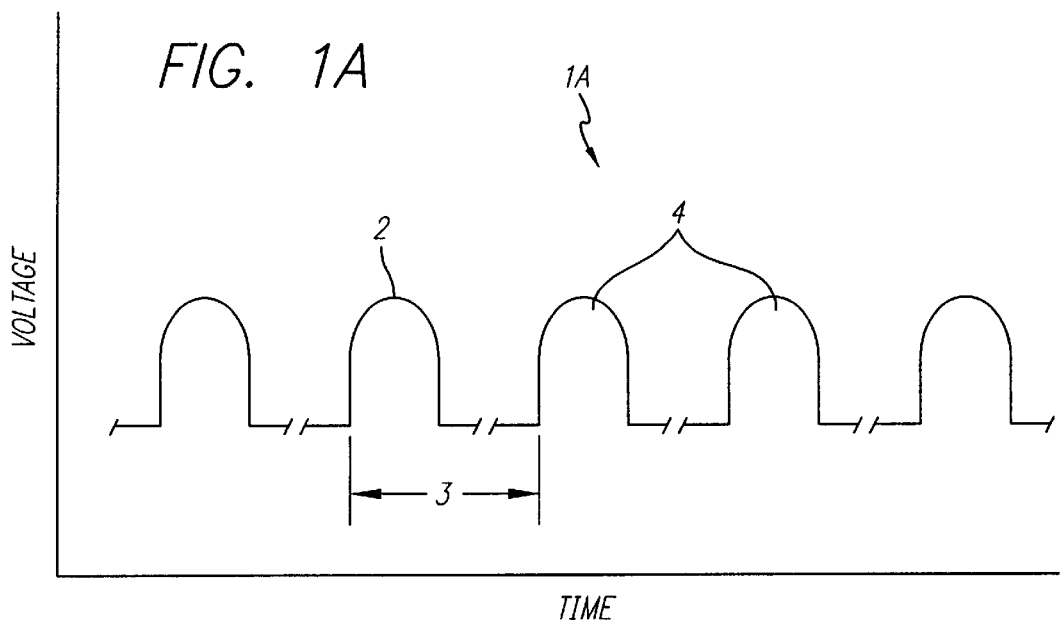
FIG. 1a: is a diagram of a possible coded signal for use with the present invention.

According to one aspect of the present invention there is provided a method of electronically controlling an electric fence energiser, characterised by the step of sending a coded signal from a sending device along an electric fence line to the electric fence energiser, said coded signal causing the state of the electric fence energiser to change.

Generally the change in state of the energiser will be on or off.

Use of a coded signal has a number of advantages. One advantage is that the signal is readily distinguished from natural noise which occurs on electric fence lines. Another advantage is that the production of a coded signal as opposed to a straight DC signal as previously, means that there is potentially less drain on the batteries of the device sending the signal.

The coded signal from the sending device may come in a variety of forms, but in one embodiment the coded signal may comprise of a number of short pulses sent at predetermined times apart. Other types of coded signals may also be sent with variations in amplitude and so forth. However the applicant has found that there can be attenuation in the amplitude of signals and therefore a coded signal which varies in the time domain is preferred to one that varies in the voltage domain.

According to a preferred aspect of the present invention there is provided a signalling device for interaction with a fence system, said device having a power supply, signal producing means, and control means for the signal producing means, the arrangement and construction being such that in operation the power supply can provide power to the signal producing means which is then controlled by the control means so that coded signal can be sent along the fence system.

The signal producing means may come in a variety of forms, however in preferred embodiments this is a capacitor. The power supply may again be any type of power supply, but in preferred embodiments shall be a battery. The control means may also come in variety of forms, but in preferred embodiments is a programmed microprocessor.

Reference throughout this specification shall now be made to the power supply as being a battery, the signal producing means being a capacitor and the control means as being a microprocessor. Other componentry may of course be used.

In previous devices, the batteries of the signalling device were connected between the electric fence line and ground, and therefore the supply of the DC signal throughout the electric fence line placed a heavy load on the battery—tending to drain same. With a send device in accordance with the present invention, the battery need only charge a capacitor (or some other pulse/signal producing device) which is then discharged into the electric fence line. Therefore, there is no direct link between the battery and the electric fence line, and the capacitor is only charged for a short period of time—thus less drain on the battery.

In preferred embodiments, a high voltage is used in the sending device (say 1000V to 20 kV), and in preferred embodiments in the order of kilovolts—which is a similar magnitude to that of electric fence energiser pulses. If a high voltage is used, then a signal is more likely to cross air gaps created by poor electrical connections (for example improperly connected fence wires) on the electric fence line.

In preferred embodiments of the present invention the signal sent along the electric fence line to the electric fence energiser may have a voltage lower than that typically produced by an electric fence energiser, but still sufficiently high to be read by a suitable receiving device and cross typical poor electrical connections found in electric fence systems.

For example with a load of 500 ohms, a low energy electric fence energiser may produce a typical fence pulse every second in the order of 3 kilovolts having a duration of approximately 30 microseconds. A high energy energiser with a load of 500 ohms may produce fence pulses having a peak voltage in the order of 4.7 kilovolts and the duration in the order of 300 microseconds. In comparison, the signal pulse in the sending device may have a peak voltage of between 800 to 3 kV and a duration in the order of 6 microseconds.

Due to the high voltage of the signalling device pulses, these pulses could appear on adjacent or nearby fence lines (by capacitor or inductive pick-up, or a direct connection etc), and turn an energiser on or off. To overcome this problem, the receiving and sending devices could have a matching selectable pulse interval or an identity code. This selectable pulse interval could be stored via a series of switches, or EPROM, or in some similar manner. The selectable pulse interval may alter the signalling device pulse interval so the units are distinguishable, and will not turn off an adjacent fence line.

A significant feature of the present invention is the ability for the receiver to not just react when it received a signal of any type, but only react when it receives a signal having the appropriate code/characteristics. Therefore, if the signals sent along one fence system are induced onto another fence system, they would not necessarily match the signal expected to be received and therefore are not affected by same. This is described in greater detail below.

For example, a user may control the code in the send or signalling device with user selectable code circuitry. This may be DIP switches or header pins or some other method. This can be used to change the timing of the signal pulse train which allows the signalling device to only act on the desired energiser.

For example, consider four neighbouring farms having each electric fence energiser all set at code 1.

| Farm 1 | Farm 3 |
| --- | --- |
| Code 1 | Code 1 |
| Farm 2 | Farm 4 |
| Code 1 | Code 1 |

If farmer 1 turns his/her system off on the fence using a sending device, the signals may be induced onto the other farms fences. This is caused by the nature of the sending pulse signals and the nature of the electric fences. This is because the signals are high voltage pulses and the fences are large conducting networks. Therefore systems on the neighbouring farms may be switched on or off.

If user selectable codes are used then the four systems can be set so that they are all different as illustrated below. No signal will therefore interfere with the neighbouring system.

| Farm 1 | Farm 3 |
| --- | --- |
| Code 1 | Code 3 |
| Farm 2 | Farm 4 |
| Code 2 | Code 4 |

The number of pulses sent from the sending device in a typical coded signal may vary but in a preferred embodiment five coded pulses will be sent.

A further advantage of having a coded signal means that a signal can be validity checked and distinguished by a control circuit within the electric fence energiser over other signals which may appear on the electric fence line.

As one of the functions of an electric fence energiser is to produce pulses, it is highly probable that a pulse could be produced by the fence energiser while the coded signal is being received. If only the exact coded signal was required to change the state of the electric fence energiser, then it is possible that the natural function of the electric fence energiser may interfere with same and multiple coded signals may have to be sent before they are received and acted on by the fence energiser.

In one embodiment of the present invention, there may be provided a feature of partial validity checking. For example, if the coded signal has five pulses and four corresponding pulse intervals, then the control means within the fence energiser need only detect say four of these pulses and three of the pulse intervals. As an example, the coded signal may comprise of five pulses which are sent at equal times apart. The partial validity checking means need only determine whether four pulses have been received and that three valid pulse intervals were detected.

In other embodiments, the times between pulses may not be equal but just predetermined.

In a further embodiment of the present invention, the control means may not act to connect or disconnect the power supply from the electric fence energiser as with previous devices, but may control directly the main pulse switching devices (generally an SCR) that discharges the main energy storage capacitor within the electric fence energiser. There is now no need to wait before an electric fence energiser can be operated as the main storage capacitor remains charged. It is only the pulse switching device that discharges the capacitor which is disabled.

A further advantage of having an embodiment as described above is that the receiving unit may be placed within the electric fence energiser rather than being a separate device.

In a preferred embodiment a capacitor divider network is used (at the energiser) to detect pulses on the fence while still providing mains isolation. The capacitor divider is also a high pass filter which removes any 50 Hz mains components (and any other low frequencies). This high pass filter enables the pulse detection level to be set as low as 200 mV (which increases the sensitivity of the receiving means to detect the sending device), while avoiding false pulse detection due to mains on the fence line.

BEST MODES FOR CARRYING OUT THE INVENTION

FIG. 1a is a voltage verses time graph in which a possible coded signal la in accordance with one possible embodiment of the present invention is shown.

Figure 1B:
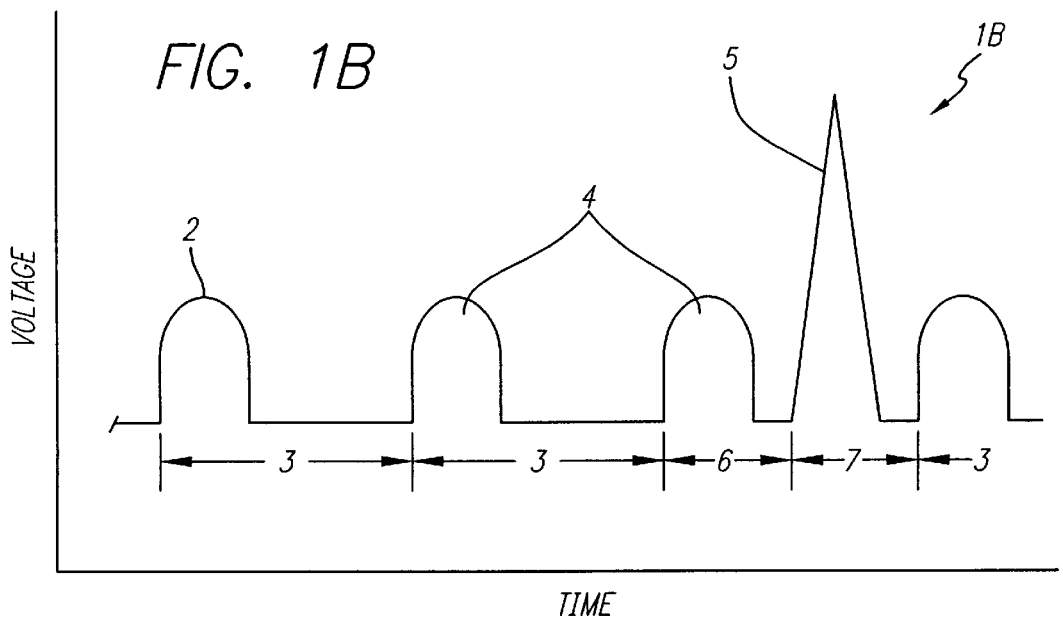
FIG. 1b: is a diagram of a possible coded signal for use with the present invention with an energiser output signal shown
Figure 2A:
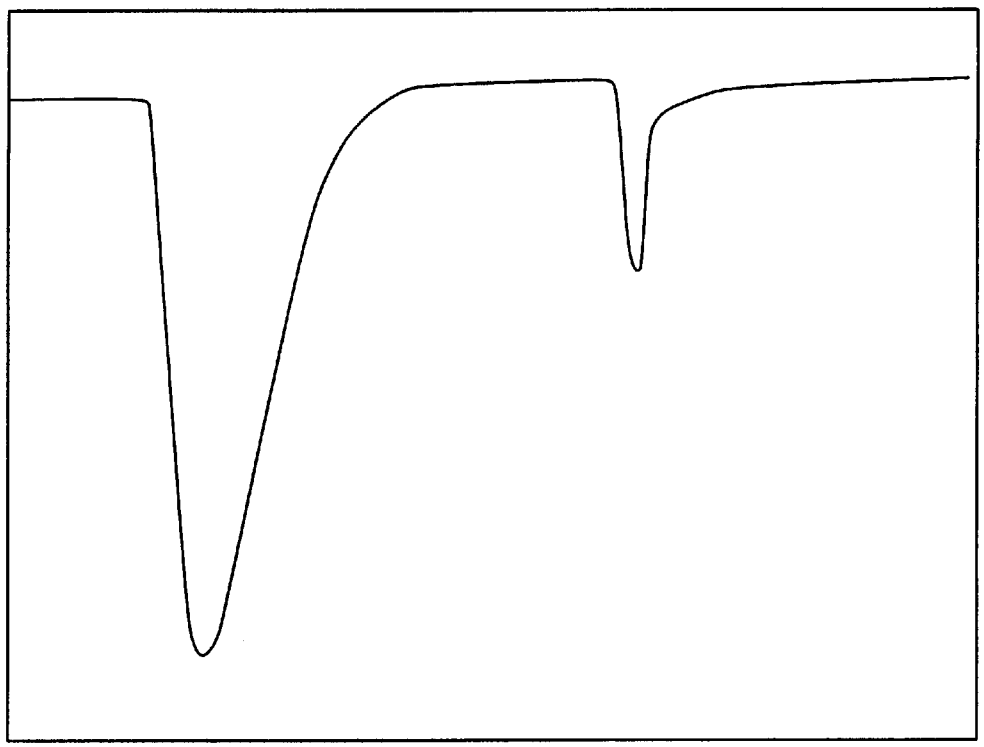
FIGS. 2a, 2b: illustrate the proportional sizes between typical electric fence pulses and signal pulses in accordance with one embodiment of the present invention.
Figure 2B:
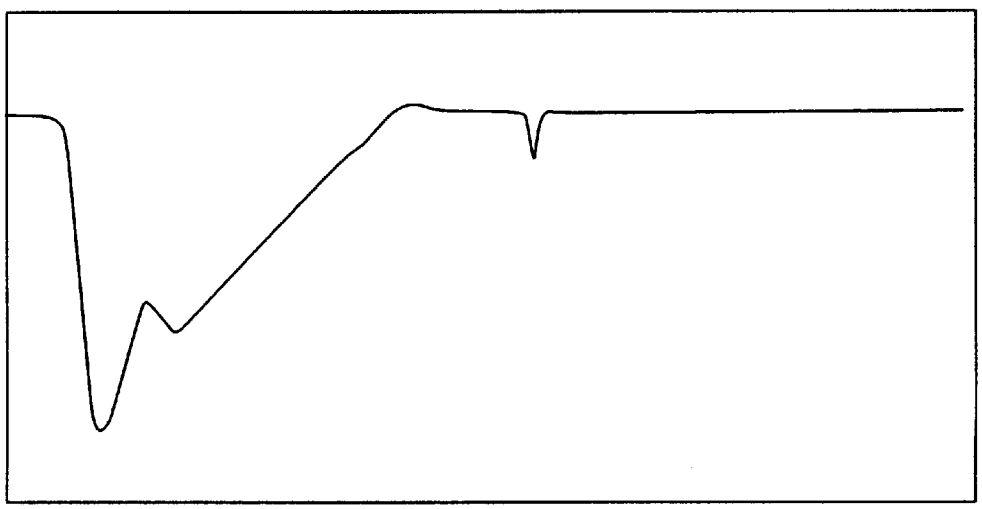

It should be appreciated that FIGS. 1a and 1b are not intended to show the relative sizes of the electric fence pulses and the coded pulses with respect to each other but merely illustrate the overall operation of the present invention. FIGS. 2a and 2b however are representative and show more clearly the relative sizes of the electric fence energiser pulse and the signal pulses from the sending device.

Referring back to FIG. 1a, there are five pulses 2, all of which are of equal height and width and are spaced at predetermined intervals.

In this particular embodiment of the present invention, the height and width of the pulses which make up the coded signal are immaterial. All that really matters is the length of time 3 between the leading edges 4 of the pulses 2. The fact that the pulses 2 are identical in height and width can be attributed to the electronic control means in the signal device.

FIG. 1b illustrates the coded signal shown in FIG. 1a, but with an electric fence pulse 5 appearing in the middle of the signal 1b. The pulses 2 are still the same periods of time 3 apart as previously. However, the receiving means in the electric fence energiser will read the pulse 5.

In addition to the expected time differences 3 between leading edges, there are also time distances 6 and 7 between the leading edges caused by the unexpected arrival of the electric fence pulse 5.

If partial validity checking is used, then the receiving means only requires three valid time periods 3. Thus the existence of the electric fence pulse 5 enables the energiser to be controlled despite the receiving means receiving a corrupted signal. The interval between coded pulses is significantly longer than an energiser pulse width so that only one of the code pulse intervals could be interfered with.

It is thought that the controlling circuitry can be incorporated into the usual energiser control. In other embodiments the control may come from a microprocessor or microcontroller device. This control means can disable the SCR so that it cannot fire in response from other signals from within the control means of the electric fence energiser.

Figure 3:
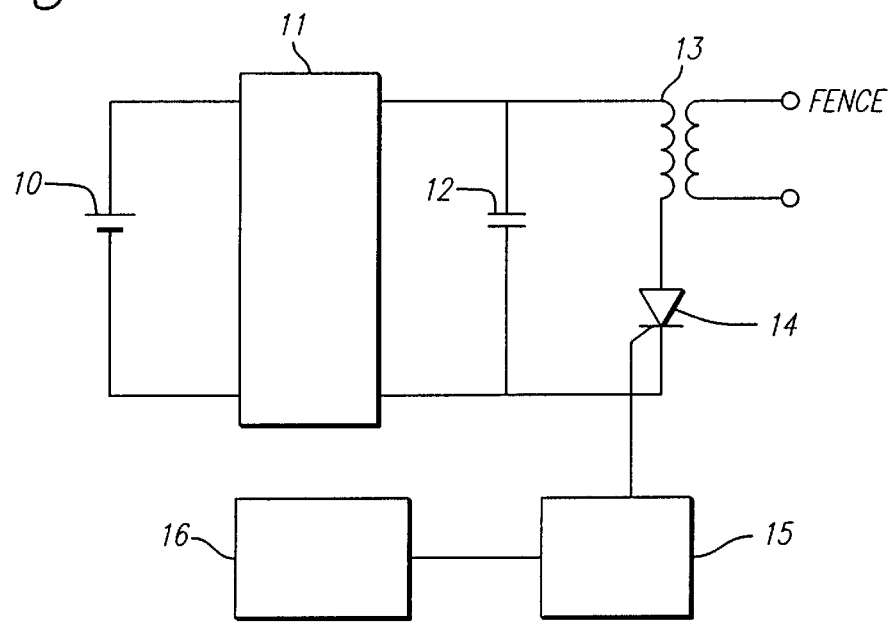
FIG. 3: is a block diagram of possible circuitry to be used with a sending or signalling device in accordance with the present invention.

Referring now to FIG. 3, there is illustrated a block diagram which shows one possible construction of a sending or signalling device in accordance with one embodiment of the present invention.

The power supply in this embodiment is either a 9 or 12 volt battery 10.

The battery 10 is connected to a DC to DC converter 11 which converts the battery voltage so that the capacitor 12 can be charged to a few hundred volts.

The capacitor 12 can be discharged through the transformer 13 via a controllable switch in the form of a SCR 14. The discharge of the capacitor 12 produces the signal pulse.

The timing of the signal pulses or discharge of the capacitor 12 is controlled by the control circuitry 15 which is governed by the user selectable code circuitry 16. The control circuitry 15 may come in a variety of forms and in some embodiments may be a microprocessor or micro controller. The user selectable code circuitry may also come in a variety of forms and may in some embodiments DIP switches or header pins.

Figure 4:
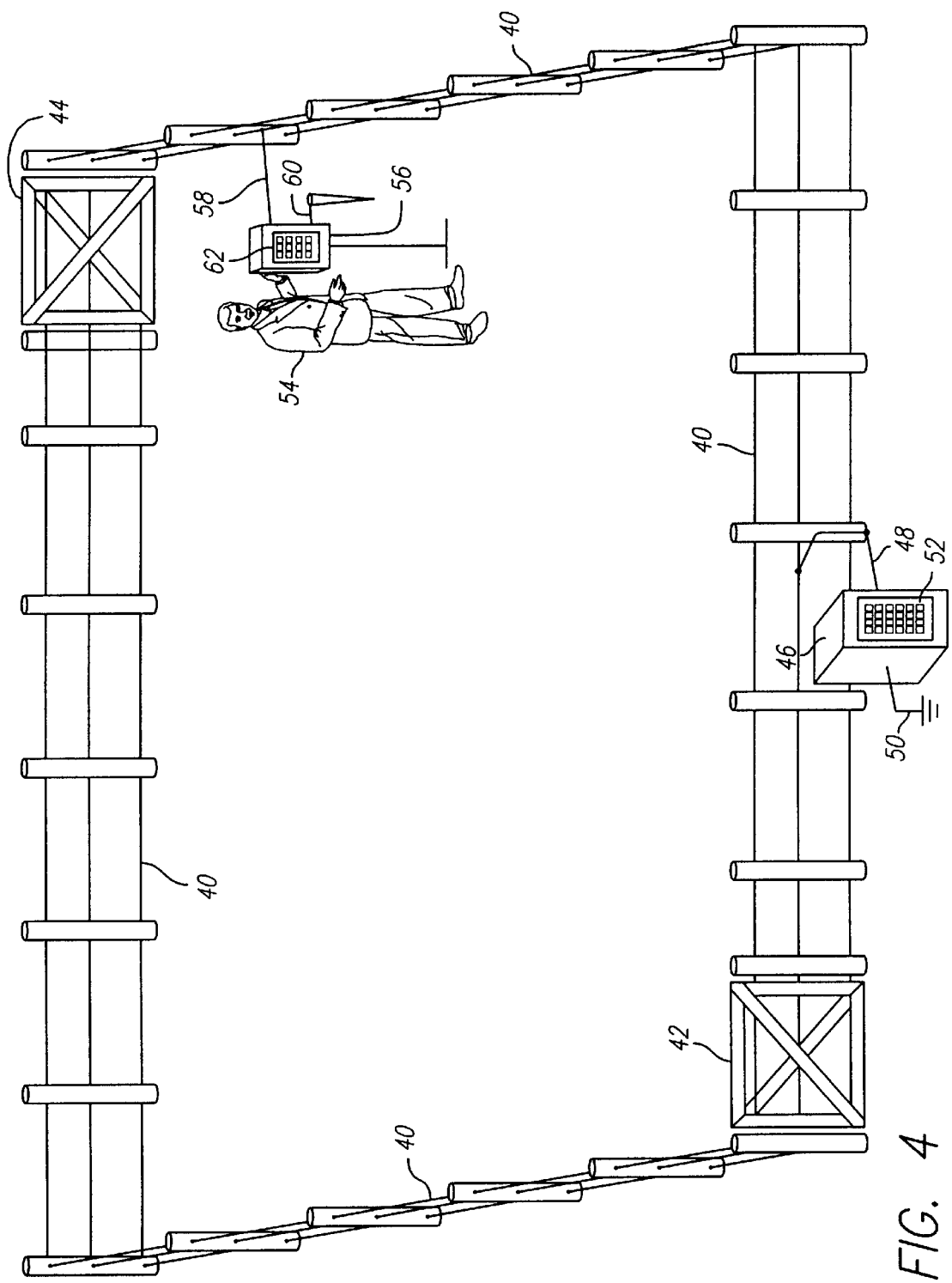
FIG. 4 illustrates an electric fence according to one embodiment of the present invention that encloses an area for keeping livestock.

As shown in FIG. 4, an electric fence 40 encloses an area for keeping livestock (not shown). The electric fence may take any number of configurations understood by those skilled in the art. The electric fence may be included with other elements of an enclosure, which may include a first gate 42 and a second gate 44 for permitting access to the enclosure and to move livestock or for other purposes. The electric fence 40 is energized under the control of an electric fence energizer 46 through a conductor 48. The energizer 46 is also coupled to earth ground through conductor 50. A control panel 52 is used to control the operation of the electric fence energizer such as to turn the energizer on or off.

A user 54 can send signal pulses on the electrical fence 40 to the control device 46 through a sending device 56 which can be connected or otherwise coupled to the electric fence through conductor 58 and to earth ground through conductor 60. The sending device includes user-selectable code circuitry, represented at 62.

Figure 5:
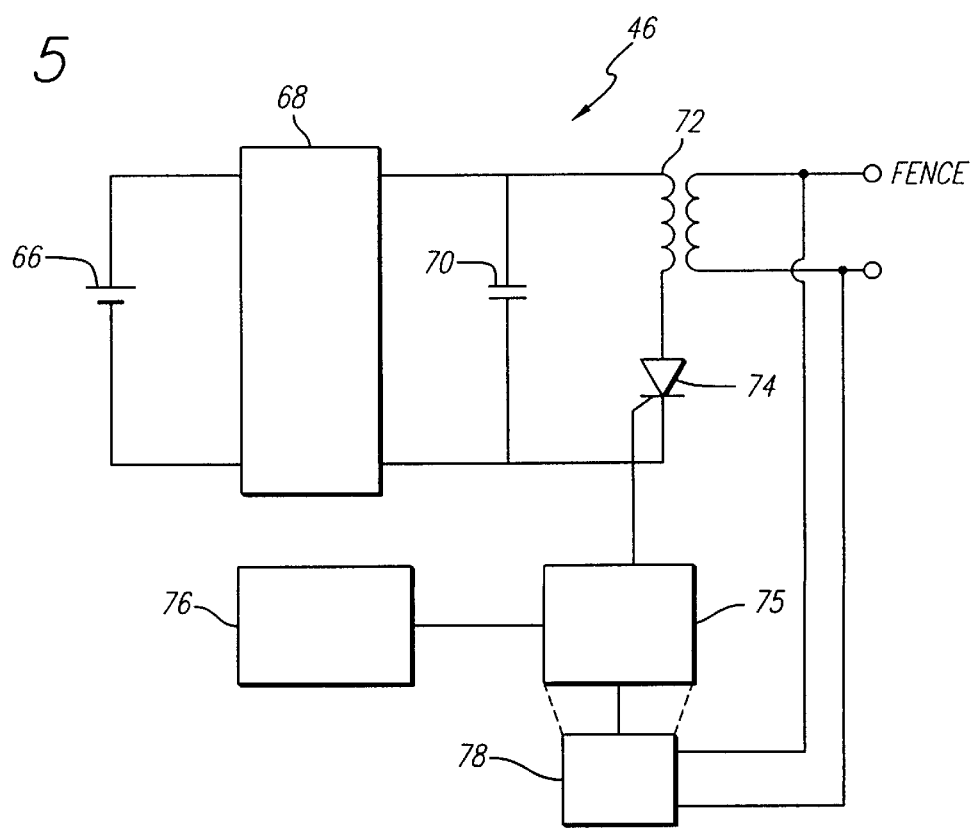
FIG. 5 is a circuit diagram of an embodiment having a receiver.

The fence energizing device 46 may include a battery 66 (FIG. 5), a DC converter 68 and a charging capacitor 70 to produce fence energizing pulses through a transformer 72. Production of pulses is controlled by an SCR 74, which in turn is controlled by control circuitry 75 operated through selectable code control circuitry 76. The fence energizer 46 may also include a separate receiver 78 for receiving signals from the fence and changing the state of the fence energizer device 46. In an alternative embodiment, the receiver 78 may be incorporated into the control circuitry 75 as a single box or unit, as represented by the dashed lines in FIG. 5.

Figure 6:
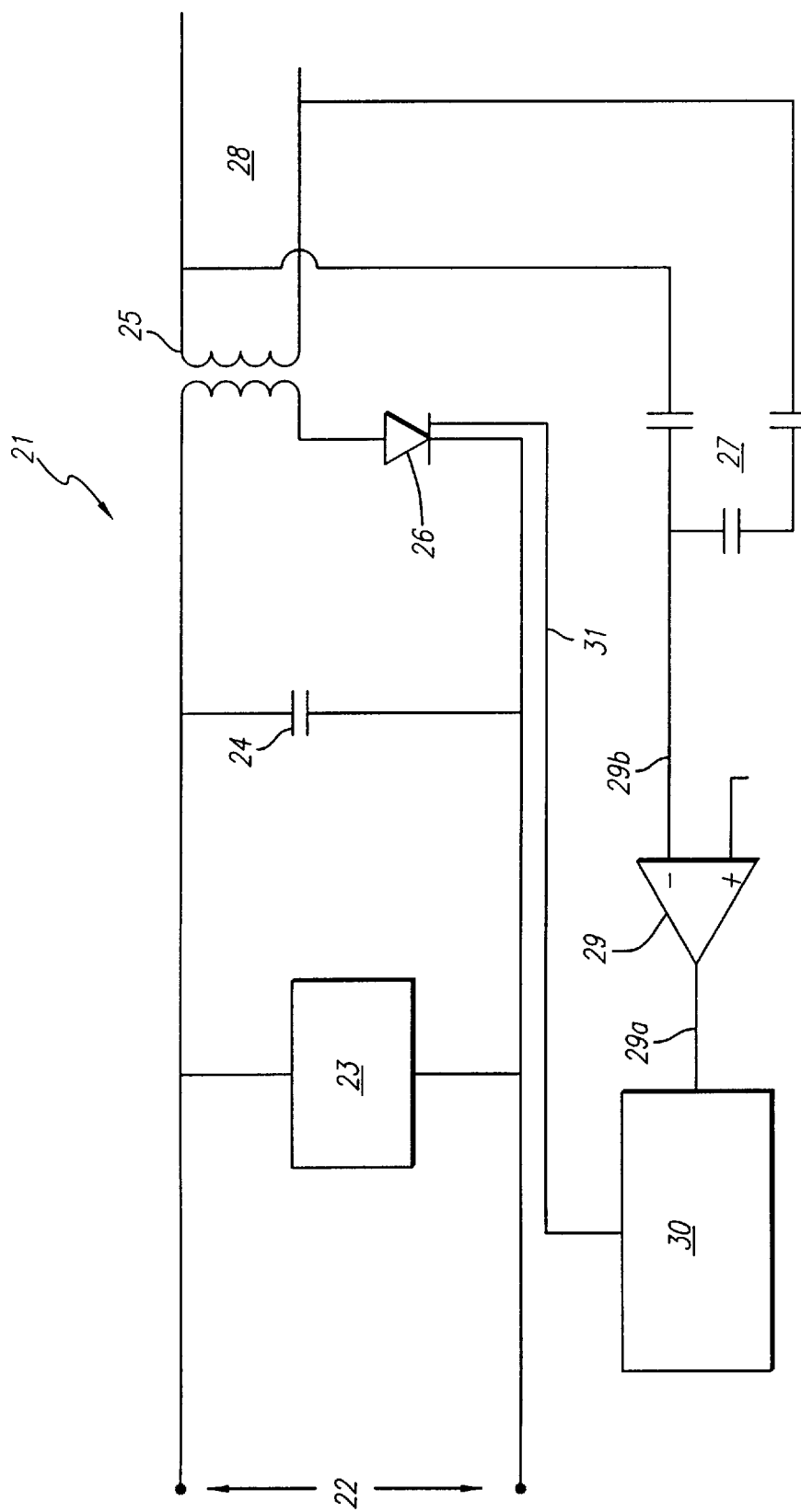
FIG. 6 is a circuit diagram of a further embodiment of the present invention.

One embodiment of an electrical fence energizer 21 (FIG. 6) includes a power supply 22 a charge control circuit 23 a storage capacitor 24 a discharge transformer 25 and a controllable switch shown in this embodiment as an SCR 26.

In normal operation the power supply 22 supplies electrical energy to the charge control circuit 23. The charge control circuit 23 then converts the electrical energy supplied to the required voltage to charge up the storage capacitor 24. The storage capacitor 24 is discharged through the discharge transformer 25 when the SCR 26 is triggered and allowed to conduct. This allows current to flow from the storage capacitor 24 through the discharge transformer 25.

The receiver also includes a capacitor divider network 27 linked to an electric fence line 28. The capacitor divider network 27 is also linked to a comparator 29, which in turn is linked to a microprocessor 30. The microprocessor 30 may control the conduction of the SCR 26 via a control line 31.

When in use, a coded signal may be transmitted along the electric fence line 28 and through the capacitor divider network 27. The capacitor divider network 27 provides electrical isolation between the two sides of the discharge transformer 25 and also acts as a high pass filter which removes any 50 hz mains power supply components from the signals received from the electric fence line 28.

The filtered signal from the capacitor divider network 27 is passed to the comparator 29. The comparator 29 will either have a high or low voltage level at its output terminal 29*a* depending on the voltage level received at its input terminal 29*b*. This distinct high or low voltage level may be easily received and interpreted by the microprocessor 30.

The microprocessor 30 will analyze the signal received from the comparator 29 and compacitor divider network 28 to determine whether a coded signal specific to the receiver has been received. If a coded signal specific to the receiver 20 has been received the microprocessor 30 will control the operation of the SCR 26 via control line 31 to either inhibit or allow the discharge of the storage capacitor 24 onto the electric fence line 28.

Aspects of the present invention have been described by way of example only and it should be appreciated that modifications and additions may be made thereto without departing from the scope thereof as defined in the appended claims.

What is claimed is:

1. A method of electronically controlling an electric fence energizer, characterized by the step of sending a coded signal along an electric fence line to the electric fence energizer, the coded signal causing the state of the electric fence energizer to change, characterized in that the method includes the step of applying partial validity checking to the coded signal.

2. A method as claimed in claim 1, wherein the coded signal varies in the time domain.

3. A signaling device for interaction with an electronic fence system, said device having a power supply, signal producing means, and control means to control the signal producing means, wherein the power supply has the ability to provide power to the signal producing means which is then controlled by the control means so that a coded signal produced by the signal producing means can be sent along the fence system, the signaling device characterized in that the coded signal produced allows partial validity checking to be applied by a receiver of the signal and, the coded signal when received causes the operative state of the electric fence systems energizer to change.

4. A receiver for receiving a coded signal associated with an electric fence line, wherein the receiver is sensitive to a particular coded signal, and may apply partial validity checking to the coded signal received, and may cause the operative state of the electric fence lines energizer to change.

5. A receiver as claimed in claim 4 wherein the receiver has direct control of the discharge mechanism of the electric fence energizer associated with the electric fence line.

6. A receiver as claimed in claim 4 wherein the receiver is incorporated within an electric fence energizer associated with the electric fence line.

7. A receiver as claimed in claim 4 wherein the receiver incorporates a filter which filters out electronic noise.

* * * * *